(12) United States Patent
Nelson et al.

(10) Patent No.: US 9,910,565 B2
(45) Date of Patent: Mar. 6, 2018

(54) SYSTEM AND METHOD FOR PROVIDING PERSONALIZATION OF A VIRTUAL SPACE BASED ON AN INDIVIDUALIZED SEED VALUE

(71) Applicant: Disney Enterprises, Inc., Burbank, CA (US)

(72) Inventors: Robert Nelson, Studio City, CA (US); Robert Lowe, Layton, UT (US)

(73) Assignee: Disney Enterprises, Inc., Burbank, CA (US)

(*) Notice: Subject to any disclaimer, the term of this patent is extended or adjusted under 35 U.S.C. 154(b) by 293 days.

(21) Appl. No.: 14/687,980

(22) Filed: Apr. 16, 2015

(65) Prior Publication Data

US 2016/0306429 A1    Oct. 20, 2016

(51) Int. Cl.

| | |
|---|---|
| *G01N 33/48* | (2006.01) |
| *G01N 33/50* | (2006.01) |
| *G06F 3/0484* | (2013.01) |
| *G06F 9/44* | (2018.01) |
| *G06F 3/01* | (2006.01) |
| *G06F 21/32* | (2013.01) |

(52) U.S. Cl.
CPC ............ *G06F 3/0484* (2013.01); *G06F 3/011* (2013.01); *G06F 9/4443* (2013.01); *G06F 21/32* (2013.01); *G06F 2203/0338* (2013.01)

(58) Field of Classification Search
None
See application file for complete search history.

(56) References Cited

U.S. PATENT DOCUMENTS

| | | | | |
|---|---|---|---|---|
| 5,299,291 | A | * | 3/1994 | Ruetz ................... H04N 1/6058 358/1.9 |
| 2004/0059922 | A1 | * | 3/2004 | Harris ..................... G06F 21/32 713/186 |
| 2006/0052153 | A1 | | 3/2006 | Vlazny |
| 2006/0224456 | A1 | | 10/2006 | Walker |
| 2006/0277100 | A1 | | 12/2006 | Parham |
| 2007/0087834 | A1 | | 4/2007 | Moser |
| 2007/0093299 | A1 | | 4/2007 | Bergeron |
| 2007/0139671 | A1 | * | 6/2007 | Stevens ................ H04N 1/6011 358/1.9 |
| 2007/0197275 | A1 | | 8/2007 | Gagner |
| 2008/0105751 | A1 | | 5/2008 | Landau |

(Continued)

FOREIGN PATENT DOCUMENTS

IN     1381KOL2007 A  *  4/2009

*Primary Examiner* — Russell S Negin
(74) *Attorney, Agent, or Firm* — Sheppard Mullin Richter & Hampton LLP

(57) ABSTRACT

A system and method for providing personalization of a virtual space based on an individualized seed value. The system may provide personalization within one or more instances of a virtual space based on an individualized seed value derived from one or more biometric samples (e.g., a fingerprint) and/other individual identifiers. One or more values may be obtained and used as the individual seed value to generate pseudorandom numbers. Personalizations affecting characteristics of one or more aspects of the virtual space may be determined based on the pseudorandom numbers generated. Presentation of the personalizations determined may be effectuated in on or more instances of the virtual space.

22 Claims, 2 Drawing Sheets

(56) References Cited

U.S. PATENT DOCUMENTS

| | | |
|---|---|---|
| 2008/0200244 A1 | 8/2008 | Rowe |
| 2009/0176566 A1 | 7/2009 | Kelly |
| 2009/0313358 A1 | 12/2009 | Shepherd |
| 2010/0324984 A1 | 12/2010 | Pelto |
| 2014/0100020 A1 | 4/2014 | Carroll |
| 2016/0042607 A1 | 2/2016 | McCoy |

* cited by examiner

SYSTEM AND METHOD FOR PROVIDING PERSONALIZATION OF A VIRTUAL SPACE BASED ON AN INDIVIDUALIZED SEED VALUE

FIELD OF THE DISCLOSURE

This disclosure relates to providing personalization of a virtual space based on an individualized seed value.

BACKGROUND

Typically, personalization within a virtual space may be limited to modifications made in response to in-space actions or user-selected customizations. For example, modifications may be made in response to actions performed by a character in a virtual space. As another example, a user may select from an in-space menu providing available customization options.

SUMMARY

Exemplary implementations may facilitate providing personalization of a virtual space based on an individualized seed value. In some implementations, an individualized seed may be a value derived from a biometric sample. By way of non-limiting example, the biometric sample may include a fingerprint and/or other biometric identification. Pseudorandom numbers (i.e., numbers that appear random but are produced by a definite mathematical procedure) may be generated using the individualized seed value (e.g., the value derived from the biometric sample). One or more personalizations of the virtual space may be determined based on the pseudorandom numbers. Responsive to determining the one or more personalizations based on the pseudorandom number, presentation of the one or more personalizations may be effectuated. In some implementations, the values derived from biometric samples may provide inherently individualized seeds because of the physical differences between users. Thus, the personalizations of the virtual space may be individualized so they are different.

In some implementations, the one or more personalizations may provide a given user a customized experience by personalizing one or more aspects of the virtual space. The personalizations may affect one or more characteristics of one or more aspects of the virtual space. In some implementations, the one or more personalizations associated with a given user (e.g., based on a value derived from a biometric sample of the given user) may be determined and/or presented the individual times the biometric sample of the given user is obtained.

In some implementations, the system may include one or more servers. The server(s) may be configured to communicate with one or more client computing platforms according to a client/server architecture. The users may access the system via client computing platform(s), for instance to view and/or interact with the virtual space. The server(s) may be configured to execute one or more computer program components to provide personalization of a virtual space based on an individualized seed value. The computer program components may include one or more of a biometric receipt component, a seed value component, a pseudorandom generation component, a personalization component, a space component, and/or other components.

The biometric receipt component may be configured to receive one or more of biometric samples, values associated with biometric samples, biometric templates associated with biometric samples, and/or other information associated with biometric samples of one or more users. The biometric samples may be a measurement and/or representation of one or more biological features of a user. Examples of biological features of a user may include one or more of a fingerprint, a face, a voice, a hand, a palm, an eye, an odor, DNA, and/or other biological features. In some implementations, the biometric receipt component may be configured to receive biometric samples, biometric templates associated with biometric samples, and/or other information associated with biometric samples from sensors in communication with and/or integrated with one or more client computing platforms, and/or from other sources.

The seed value component may be configured to obtain values derived from biometric samples. A given value may be derived from a given biometric sample of a given user. In some implementations, the values derived from biometric samples of different users may be different due to the physical differences between users. In some implementations, the values may be stored in a corresponding user profile.

The pseudorandom generation component may be configured to generate pseudorandom numbers. Pseudorandom numbers may include one or more numbers in a sequence of numbers that appear random but are produced by a definite mathematical procedure. The pseudorandom numbers may be based on the values derived from the biometric samples. A given pseudorandom number may be generated by using the given value derived from the given biometric sample of the given user as an individualized seed value. The given value may be used as the individualized seed value in a pseudorandom number generator (e.g., an algorithm). Using the given value as the individualized seed for the pseudorandom number generator may produce the same pseudorandom number the individual times the pseudorandom number is generated. In some implementations, the pseudorandom number may be one or more numbers in a sequence of numbers.

The personalization component may be configured to determine one or more personalizations based on the pseudorandom numbers. The personalizations may affect one or more characteristics of one or more aspects of the virtual space. One or more characteristics may include one or more of a visual appearance, an auditory characteristic, a behavioral characteristic, a storyline, and/or other characteristics. One or more aspects of the virtual space may include one or more of an environment within the virtual space, a character within the virtual space, a theme of the virtual space, and/or other aspects of the virtual space.

In some implementations, a first personalization affecting a first characteristic of a first aspect may be determined based on a first pseudorandom number. A corresponding second personalization affecting a corresponding second characteristic of a corresponding second aspect may be determined based on a second pseudorandom number. The first pseudorandom number may be generated using the first value derived from the first biometric sample of the first user as a seed. The second pseudorandom number may be generated using the second value derived from the second biometric sample of the second user as a seed.

In some implementations, a given pseudorandom number generated may be used in one or more algorithms to determine multiple given personalizations. In some implementations, the given pseudorandom number may include a given sequence of numbers such that a series of given personalizations are determined based on the given sequence of numbers generated.

In some implementations, the first personalization affecting the first characteristic of the first aspect may be determined based on the first pseudorandom number corresponding to a first table value in a lookup table. The second personalization affecting the corresponding second characteristic of the corresponding second aspect may be determined based on the second pseudorandom number corresponding to a second table value in the lookup table.

The space component may be configured to effectuate presentation of the one or more personalizations in the virtual space. Personalizations based on different biometric samples of different users may be different. In some implementations, presentation of the first personalization may be effectuated in a first instance of the virtual space, presentation of the second personalization may be effectuated in a second instance of the virtual space, and/or presentation of both the first personalization and the second personalization may be effectuated in the same instance of the virtual space.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
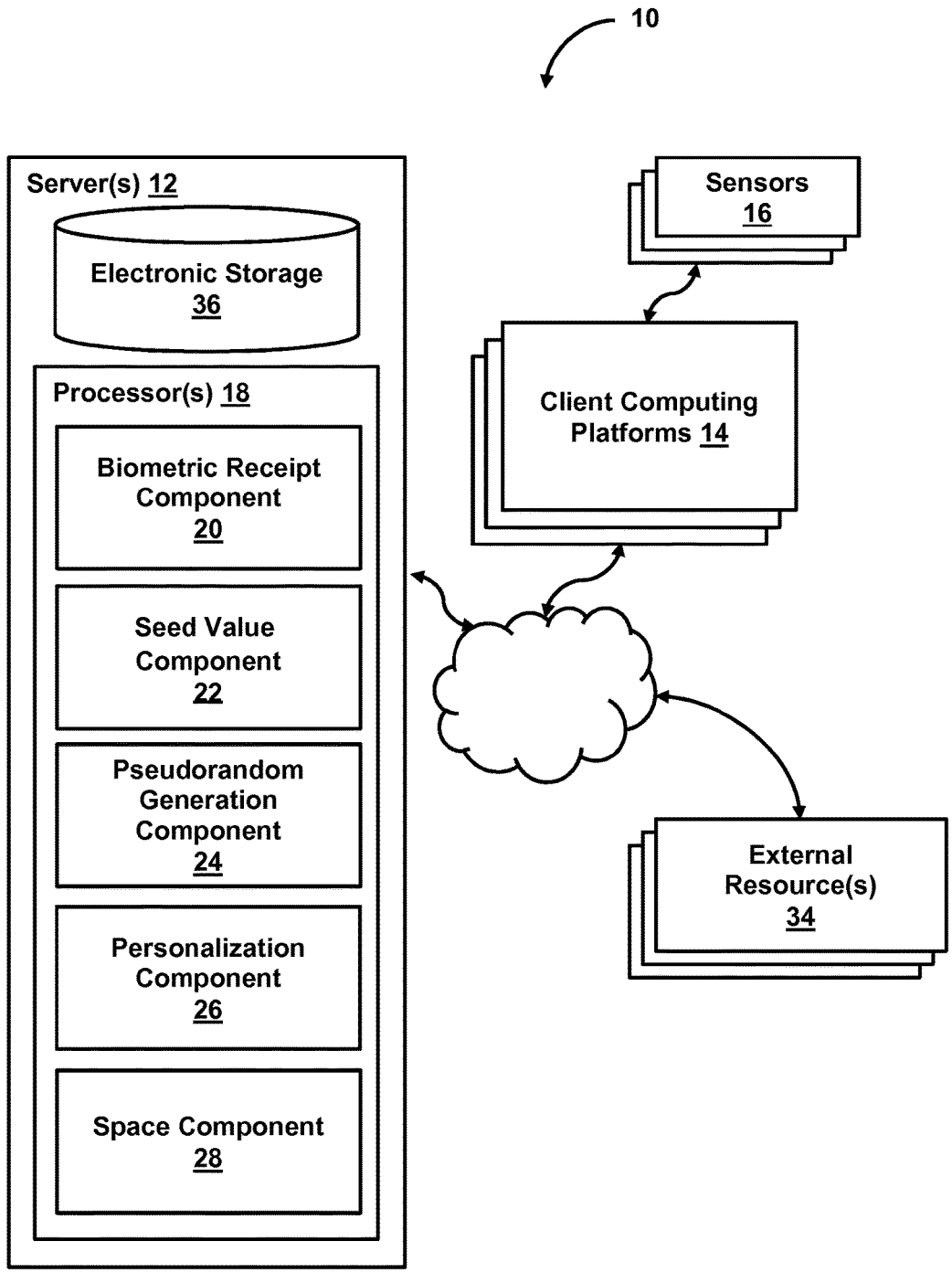
FIG. 1 illustrates a system configured to provide personalization of a virtual space based on an individualized seed value, in accordance with one or more implementations.

FIG. 1 illustrates a system 10 configured to provide personalization of a virtual space based on an individualized seed value, in accordance with one or more implementations. System 10 may provide personalization within one or more instances of a virtual space based on an individualized seed value derived from one or more biometric samples (e.g., a fingerprint). One or more values may be obtained and used as a seed to generate pseudorandom numbers. The pseudorandom numbers may provide the basis for determining personalizations affecting characteristics of one or more aspects of the virtual space. Presentation of the personalizations may be effectuated. In some implementations, pseudorandom numbers associated with different users may be different because they are generated using values derived from different biometric samples of the different users. As such, the one or more personalizations may be different for different users.

System 10 may include one or more server(s) 12. In some implementations, server(s) 10 may be configured to communicate with one or more client computing platforms (e.g., client computing platforms 14) according to a client/server architecture. In some implementations, client computing platform(s) 14 may communicate with other client computing platform(s) 14 according to a peer-to-peer architecture. The users may access system 10 via client computing platform(s) 14, for instance to view and/or interact with the virtual space.

The server(s) 12 may be configured to execute one or more computer program components. The computer program components may include one or more of a biometric receipt component 20, a seed value component 22, a pseudorandom generation component 24, a personalization component 26, a space component 28, and/or other components.

Biometric receipt component 20 may be configured to receive one or more of biometric samples, values associated with biometric samples, biometric templates associated with biometric samples, and/or other information associated with biometric samples of one or more users. The biometric samples may be a measurement and/or representation of one or more biological features of a user. The one or more biological features of a user may include one or more of a fingerprint, a face, a voice, a hand, a palm, an eye, an odor, DNA (deoxyribonucleic acid), and/or other biological features. In some implementations, the biometric receipt component 20 may be configured to receive the biometric samples, values associated with biometric samples, biometric templates associated with biometric samples, and/or other information associated with biometric samples from sensor(s) 16 in communication and/or integrated with one or more client computing platforms, and/or from other locations.

In some implementations, sensor(s) 16 may include one or more biometric sensors for measuring biological features and providing a value and/or signal corresponding to the measured biological features. By way of example, sensor(s) 30 may include one or more of a camera, a microphone, a scanner, a thermal sensor, an ultrasound sensor, an electric field sensor, a capacitive sensor, an optical sensor, and/or other sensors. Sensor(s) 16 may be separate from client computing platform(s) 14. In some implementations, sensor(s) 16 may be integrated into client computing platform(s) 14. For example, a fingerprint scanner may be integrated in a user's mobile device.

In some implementations, sensor(s) 16 may include a touch screen. The touch screen may include a high resolution touch screen such that it may act as a screen and a biometric sensor. In some implementations, a user may touch an aspect of the virtual space presented on the touch screen that they want to personalize. The aspect touched may be personalized based on the user's fingerprint.

Seed value component 20 may be configured to obtain values derived from biometric samples and/or other individual identifiers. One or more values may be derived from one or more biometric samples and/or individual identifiers. By way of non-limiting example, the one or more values may be derived by determining multiple biometric points on a scan of the biometric feature of a user, taking measurements between the biometric points, compiling the measurements to obtain a value derived from the biometric sample, and/or by other steps and/or methods. In some implementations, a first value may be derived from a first biometric sample of a first user. A second value may be derived from a second biometric sample of a second user. The first value may be different from the second value. The first value being different from the second value may be due to physical differences between the first user and the second user and/or for other reasons. For example, measurements between biometric points on a scan of the first user's face may be different than the measurements between biometric points on a scan of the second user's face because the first user and the second user may not have the same facial structure and/or composition.

In some implementations, values may be derived from other individual identifiers corresponding to a given user and/or a given machine. Values may be derived from any combination, whole or in part, of individual identifiers and/or biometric samples. By way of example, an individual identifier may include one or more of a unique username, a user-specific number, an IP address, and/or other individual identifiers.

Seed value component 20 may be configured such that for a given biometric sample and/or individual identifier, the values derived are constant. For example, the same values may be derived the individual times the given biometric sample of a given user is obtained because the given biometric sample of the given user may not change. As such, the values obtained may be associated with the given user. Values associated with a given user may be stored in a corresponding user profile. In some implementations, the one or more values may be constant because they may be derived from the given biometric sample according to an algorithm. The individual times one or more numbers are derived from a given biometric sample and/or an individual identifier according to the same algorithm, the same result may occur. By way of non-limiting example, the value associated with the first user that is derived from the first biometric sample may always be the same because it may be derived from the first biometric sample according to a given algorithm.

In some implementations, values derived from the biometric samples may be stored in one or more locations (e.g., electronic storage 36). The values may be stored in corresponding user profiles. The first value derived from the first biometric sample of the first user may be stored in a corresponding first user profile. The second value derived from the second biometric sample of the second user may be stored in a corresponding second user profile. By way of a non-limiting use example, the first value may be stored with other user information in the first user profile and/or associated with a first user identification so that the first value may be obtained from the first user profile by the first user entering, scanning, and/or otherwise supplying their user identification.

In some implementations, seed value component 22 may be configured to obtain the values by deriving them from biometric samples and/or other individual identifiers. Seed value component 22 may be configured to obtain the values by receiving the derived values from one or more sources. In some implementations, seed value component 22 may obtain biometric samples and/or values derived from biometric samples from biometric receipt component 20, storage associated with system 10 (e.g., electronic storage 36, client computing platforms 14, sensors 16, and/or external resources 34), corresponding user profiles, and/or other sources.

In some implementations, seed value component 22 may obtain other individual identifiers and/or values derived from other individual identifiers from one or more sources including one or more of client computing platforms 14, external resources 34, electronic storage 36, and/or other sources. By way of example, seed value component 22 may receive an image of a fingerprint of a user and use the image to derive and obtain the values. By way of another example, seed value component 22 may obtain a value derived from a username from a storage database, corresponding user profile, and/or other location. By way of yet another example, seed value component 22 may receive user login information (e.g., the username) from a client computing platform and obtain a value previously derived from a biometric sample of the user stored in the corresponding user profile.

Pseudorandom generation component 24 may be configured to generate pseudorandom numbers. A pseudorandom number may include one or more numbers in a sequence of numbers that appear random but are produced by a definite mathematical procedure (e.g., an algorithm). The pseudorandom numbers may be based on the values derived from the biometric samples. A given pseudorandom number may be based on a given value derived from a given biometric sample because it may be generated using the given value as an individualized seed value. The given value may be used as the individualized seed value in a pseudorandom number generator (e.g., an algorithm).

In some implementations, the pseudorandom number may include one or more numbers in the sequence of numbers. A pseudorandom number generator may generate one or more numbers in a sequence of numbers that may appear to be random but are actually a sequence produced by a definite mathematical procedure. Initializing a pseudorandom number generation using a seed may generate pseudorandom numbers according to the algorithm. The same pseudorandom numbers may be generated in the same sequence the individual times the pseudorandom number generator is initialized using the same seed. However, using a different seed may generate different pseudorandom numbers in a different sequence. Thus, using the given value derived from the given biometric sample as the individualized seed for the pseudorandom number generator may produce the same sequence of pseudorandom numbers the individual times the pseudorandom number is generated.

Personalization component 26 may be configured to determine one or more personalizations. The one or more personalizations may be based on the pseudorandom numbers generated by pseudorandom generation component 24 and/or other factors. The one or more personalizations may affect characteristics of one or more aspects of the virtual space. Aspects of the virtual space may include one or more of an environment within the virtual space, a character within the virtual space, a theme of the virtual space, and/or other aspects of the virtual space.

The environment within the virtual space may include the surroundings and/or conditions within the virtual space. For example, the environment within the virtual space may include one or more of a landscape, a terrain, an atmosphere, vegetation, construction and/or structures, laws of nature governing the virtual space, sounds, location, and/or other environments within the virtual space. By way of a non-limiting use example, a personalization may determine a characteristic of the buildings in a town within the virtual space.

The character within the virtual space may include an object (or group of objects) present in the virtual space. For example, the character within the virtual space may include one or more of a user character, a non-user character, and/or other objects in the virtual space. As used herein, the term "user character" may refer to an object (or group of objects) present in the virtual space that represents an individual user. The user character may be controlled by the user with which it is associated. The user character may move through and interact with the virtual space (e.g., non-user characters in the virtual space, other objects in the virtual space). The term "non-user character", as used herein, may refer to an object (or group of objects) that is not primarily controlled by the user. A non-user character may interact with a user-character, other non-user characters, the virtual space, and/or other objects within the virtual space. In some implementations, the non-user character may interact with the user-character such that a user may have some secondary control over the non-user character based on the interaction. By way of a non-limiting use example, a user-character within the virtual space may include an avatar. By way of another non-limiting use example, a non-user character within the virtual space may include a villain.

The theme of a virtual space may include a unifying subject associated with the virtual space. For example the theme of the virtual space may include a plurality of characters associated with the theme, visual effects associated with the theme, goals and/or actions associated with the theme, sounds associated with the theme, characters associated with the theme, a story associated with the theme, and/or other themes and/or items associated with the theme of the virtual space. By way of a non-limiting use example, a theme may be Toy Story and the characters associated with the theme may include Woody and Buzz Lightyear.

Characteristics of one or more aspects of the virtual space may include one or more of a visual appearance, an auditory characteristic, a behavioral characteristic, a storyline, and/or other characteristics of one or more aspects of the virtual space. Visual appearance may include one or more characteristics influencing the "look" of an aspect of the virtual space. For example, visual appearances may include one or more of a color, a texture, a hue, a pattern, a brightness, a size, a shape, and/or other visual appearances. By way of a non-limiting use example, a personalization may determine that the color of the sky in the virtual space is grey.

Auditory characteristics may include one or more sound characteristics of an aspect of the virtual space. For example, auditory characteristics may include one or more of music, tone, pitch, speed of an auditory feature, volume, dialect, accent, and/or other auditory characteristics. By way of a non-limiting use example, a personalization may determine that the accent of player character within a virtual space is British.

Behavioral characteristics may include one or more characteristics describing the manner in which one or more player characters, non-player characters, and/or other aspects of the virtual space interact with each other and/or other users. For example, behavioral characteristics may include one or more of a speed of movement, type of movement, law of nature, level of interaction, method of interaction, and/or other behavioral characteristics. By way of a non-limiting use example, a personalization may determine that the movement-type of a player-character is hopping.

The storyline may include one or more characteristics of and/or events within the storyline of the virtual space. For example, the storyline may include one or more of a background of the virtual space, a goal of the virtual space, an event in the virtual space, an action in the virtual space, an interruption of the virtual space, a challenge within the virtual space, and/or other storylines. By way of a non-limiting use example, a personalization may determine that the background of the virtual space is that gold has been stolen by an evil queen character and the goal of the virtual space is that the player character retrieves the gold.

In some implementations, a first personalization affecting a first characteristic of a first aspect may be determined based on a first pseudorandom number. A corresponding second personalization affecting a corresponding second characteristic of a corresponding second aspect may be determined based on a second pseudorandom number. The first pseudorandom number may be generated using the first value derived from the first biometric sample of the first user as a seed. The second pseudorandom number may be generated using the second value derived from the second biometric sample of the second user as a seed. Thus, in some implementations, the first personalization may be associated with the first user and/or the second personalization may be associated with the second user.

By way of a non-limiting use example, the first value (e.g., 1234) derived from the first biometric sample of the first user may be used as a seed to generate the first pseudorandom number (e.g., 5678). Continuing the example, the first value (e.g., 1234) may be consistently obtained from the first biometric sample of the first user and the first pseudorandom number (e.g., 5678) may be consistently generated using the first value (e.g., 1234) as a seed, and so the first personalization (e.g., making the avatar's hair blue) may be consistent the individual times the first user accesses the virtual space using the first biometric sample.

In some implementations, determining a given personalization affecting a given characteristic may include determining one or more table values in a lookup table. A given pseudorandom number may correspond to one or more table values in a lookup table. By way of non-limiting example, the lookup table may include a color lookup table and a given pseudorandom number may correspond to a given table value for the color light blue. Continuing the example, a given personalization may affect the color of a given aspect such that it may be determined the color is light blue. In some implementations, the first personalization affecting the first characteristic of the first aspect may be determined based on the first pseudorandom number corresponding to a first table value in a lookup table. The second personalization affecting the corresponding second characteristic of the corresponding second aspect may be determined based on the second pseudorandom number corresponding to a second table value in the lookup table.

In some implementations, a given aspect of the virtual space may have one or more corresponding algorithms for determining one or more characteristics of the given aspect. Therefore, one pseudorandom number may be used to determine multiple characteristics of multiple aspects of the virtual space. The given pseudorandom number may be used according to the one or more corresponding algorithms to determine multiple personalizations of the virtual space. In some implementations, the first pseudorandom number generated may be used in one or more algorithms to determine multiple first personalizations affecting multiple first characteristics of multiple first aspects. The second pseudorandom number generated may be used in one or more algorithms to determine multiple second personalizations affecting multiple second characteristics of multiple second aspects.

By way of a non-limiting use example, a pseudo-randomly generated number of 4321 may be used in several algorithms to generate a number corresponding to a specific color for multiple aspects of the virtual space. Continuing the example, using the same seed value will consistently generate the number 4321 and using 4321 in the several algorithms will consistently determine the personalizations, and so the personalization of the virtual space will be consistent the individual times a user accesses the virtual space using their biometric sample.

In some implementations, the pseudorandom numbers may include a sequence of numbers. A series of given personalizations may be determined based on a given sequence of pseudorandom numbers generated. The first pseudorandom number may include a first sequence of numbers. A series of first personalizations may be determined based on the first sequence of numbers generated. In some implementations, the second pseudorandom number may include a second sequence of numbers. A series of second personalizations may be determined based on the second sequence of numbers generated.

By way of a non-limiting use example, using the first value (e.g., 0012) as a seed will consistently generate the first sequence of pseudorandom numbers (e.g., 1234, 2345, 3456, 4567, and/or other numbers in the sequence). Continuing the example, a first sequence number (e.g., 1234) may be used to determine a first series personalization (e.g., the texture of the terrain), a second sequence number (e.g., 2345) may be used to determine a second series personalization (e.g., the color of the sky), a third sequence number (e.g., 3456) may be used to determine a third series personalization (e.g., the user-character's voice), a fourth sequence number (e.g., 4567) may be used to determine a fourth series personalization (e.g., events of a storyline associated with the theme); and so on such that the personalization of the virtual space may be consistently determined according to the first sequence.

In some implementations, a user may select aspects of the virtual space to personalize. The characteristics of the aspects selected may be determined based on the pseudorandom numbers generated based on the values derived from the biometric sample of the user. For example, a user may select one or more aspects by touching them, clicking on them, selecting them from an inventory of customizable aspects, and/or otherwise selecting them. In some implementations, the user may touch a touch screen to provide their biometric sample for use in determining the one or more personalizations of the virtual space. For example, a user may touch the screen where an aspect they want to personalize is being presented. Continuing the example, the screen may read the user's fingerprint to determine the characteristic that should be applied to the aspect touched (e.g., the user touches the sky to personalize the weather and based on the user's fingerprint, the weather changes and starts to present rain).

In some implementations, the one or more personalizations may affect characteristics of one or more aspects of the virtual space in a way that may mimic the characteristics of one or more aspects of the virtual space just before a user paused and/or left the virtual space in a previous encounter. By providing their biometric sample for the system to use as an individualized seed, the user may provide a figurative key to unlock their personalized virtual space.

Space component 28 may be configured to effectuate presentation of the one or more personalizations. Personalizations based on different biometric samples of different users may be different. The first personalization may be different than the second personalization. In some implementations, presentation of the first personalization may be effectuated in a first instance of the virtual space. Presentation of the second personalization may be effectuated in a second instance of the virtual space. The first instance of the virtual space may be different than the second instance of the virtual space. For example, the first instance of the virtual space may be presented on a first client computing platform (e.g., a user computer) associated with the first user. By way of another example, the second instance of the virtual space may be presented on a second client computing platform (e.g., a tablet). In the above two examples, the first user may not see the second personalization and the second user may not see the first personalization.

In some implementations, presentation of both the first personalization and the second personalization may be effectuated in the same instance of the virtual space. Responsive to presentation of both the first personalization and the second personalization being effectuated in the same instance of the virtual space, the first user associated with the first personalization and the second user associated with the second personalization may see both the first personalization and second personalization in the instance of the virtual space.

Space component 28 may be configured to implement the one or more instances of the virtual space executed by the computer components to determine views of the virtual space. In some implementations, the views may then be communicated (e.g., via streaming, via object/position data, and/or other information) from server(s) 12 to client computing platform(s) 14 for presentation to users. The view determined and presented to a given user may correspond to a user character being controlled by the given user. The view determined and presented to the given user may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via server(s) 12 and/or clients (e.g., client computing platform(s) 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The description herein of the manner in which views of the virtual space are determined by space component 28 is not intended to be limiting. Space component 28 may be configured to express the virtual space in a more limited, or richer, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space component 28, users may control characters, objects, simulated physical phenomena (e.g., wind, rain, earthquakes, and/or other phenomena), and/or other elements within the virtual space to interact with the virtual space and/or each other. The user characters may include avatars.

The user character may be controlled by the user with which it is associated. The user controlled element(s) may move through and interact with the virtual space (e.g., non-user characters in the virtual space, other objects in the virtual space). The user controlled elements controlled by and/or associated with a given user may be personalized and/or created by servers 12 and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through server(s) 12 and/or clients (e.g., client computing platform(s) 14). The users may interact with each other through communications exchanged within the virtual space. Such communications may include one or more of textual chat, instant messages, private messages, voice communications, and/or other communications. Communications may be received and entered by the users via their respective server(s) 12 and/or client(s) (e.g., client computing platform(s) 14). Communications may be routed to and from the appropriate users through server(s) 12 (e.g., through space component 28).

In some implementations, two or more components of system 10 (e.g., server(s) 12, client computing platform(s) 14, sensors 16, and/or external resources 34) may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which two or more components of system 10 may be operatively linked via some other communication media.

A given client computing platform 14 may include one or more processors configured to execute computer program components. The computer program components may be configured to enable an expert or user associated with the given client computing platform 14 to interface with system 10 and/or external resources 34 and/or provide other functionality attributed herein to client computing platform(s) 14. By way of non-limiting example, the given client computing platform 14 may include one or more of a desktop computer, a laptop computer, a handheld computer, a NetBook, a Smartphone, a gaming console, and/or other computing platforms.

The external resources 34 may include sources of information, hosts and/or providers of virtual environments outside of system 10, external entities participating with system 10, and/or other resources. In some implementations, some or all of the functionality attributed herein to external resources 34 may be provided by resources included in system 10.

The server(s) 12 may include electronic storage 36, one or more processors 18, and/or other components. The server(s) 12 may include communication lines, or ports to enable the exchange of information with a network and/or other computing platforms. Illustration of server(s) 12 in FIG. 1 is not intended to be limiting. The server(s) 12 may include a plurality of hardware, software, and/or firmware components operating together to provide the functionality attributed herein to server(s) 12. For example, server(s) 12 may be implemented by a cloud of computing platforms operating together as server(s) 12.

Electronic storage 36 may comprise electronic storage media that electronically stores information. The electronic storage media of electronic storage 38 may include one or both of system storage that is provided integrally (i.e., substantially non-removable) with virtual space platform(s) 102 and/or removable storage that is removably connectable to server(s) 12 via, for example, a port (e.g., a USB port, a firewire port, etc.) or a drive (e.g., a disk drive, etc.). Electronic storage 36 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 36 may include one or more virtual storage resources (e.g., cloud storage, a virtual private network, and/or other virtual storage resources). Electronic storage 36 may store software algorithms, information determined by processor(s) 18, information received from one or more other components of system 10, and/or other information that enables server(s) 12 to function as described herein.

The processor(s) 18 may be configured to provide information processing capabilities in server(s) 12. As such, processor(s) 18 may include one or more of a digital processor, an analog processor, digital circuit designed to process information, an analog circuit designed to process information, a state machine, and/or other mechanisms for electronically processing information. Although processor(s) 18 is shown in FIG. 1 as a single entity, this is for illustrative purposes only. In some implementations, processor(s) 18 may include a plurality of processing units. These processing units may be physically located within the same device, or processor(s) 18 may represent processing functionality of a plurality of devices operating in coordination. The processor(s) 18 may be configured to execute machine readable instruction components 20, 22, 24, 26, 28, and/or other components. The processor(s) 18 may be configured to execute components 20, 22, 24, 26, 28, and/or other components by software; hardware; firmware; some combination of software, hardware, and/or firmware; and/or other mechanisms for configuring processing capabilities on processor(s) 18.

It should be appreciated that although components 20, 22, 24, 26, and 28 are illustrated in FIG. 1 as being co-located within a single processing unit, in implementations in which processor(s) 18 includes multiple processing units, one or more of components 20, 22, 24, 26, and/or 28 may be located remotely from the other components. The description of the functionality provided by the different components 20, 22, 24, 26, and/or 28 described herein is for illustrative purposes, and is not intended to be limiting, as any of components 20, 22, 24, 26, and/or 28 may provide more or less functionality than is described. For example, one or more of components 20, 22, 24, 26, and/or 28 may be eliminated, and some or all of its functionality may be provided by other ones of components 20, 22, 24, 26, and/or 28. As another example, processor(s) 18 may be configured to execute one or more additional components that may perform some or all of the functionality attributed herein to one of components 20, 22, 24, 26, and/or 28.

Figure 2:
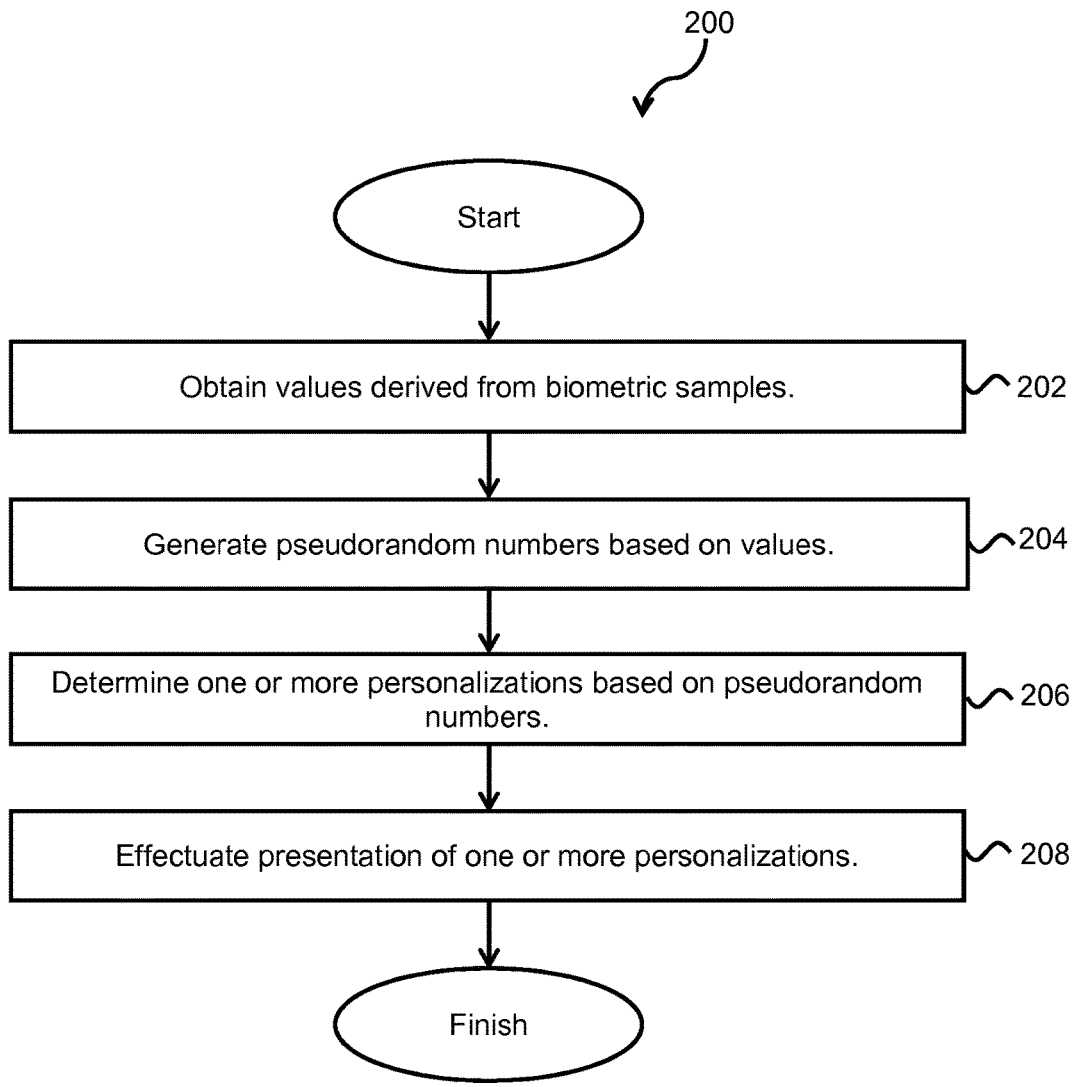
FIG. 2 illustrates a method for providing personalization of a virtual space based on an individualized seed value, in accordance with one or more implementations.

FIG. 2 illustrates a method 200 for providing personalization of a virtual space based on an individualized seed value, in accordance with one or more implementations. The operations of method 200 presented herein are intended to be illustrative. In some embodiments, method 200 may be accomplished with one or more additional operations not described, and/or without one or more of the operations discussed. Additionally, the order in which the operations of method 200 are respectively illustrated in FIG. 2 and described herein is not intended to be limiting.

In some embodiments, method 200 may be implemented in one or more processing devices. One or more processing devices may include, for example, one or more of a digital processor, an analog processor, a digital circuit designed to process information, an analog circuit designed to process information, a state machine, and/or other mechanisms for electronically processing information. The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, values derived from biometric samples may be obtained. A first value may be derived from a first biometric sample of a first user. A second value may be derived from a second biometric sample of a second user. The first value may be different from the second value. The first value may be different from the second value due to physical differences between the first user and the second user. Operation 202 may be performed by one or more processors configured to execute a seed value component that is the same as or similar to seed value component 22, in accordance with one or more implementations.

At an operation 204, pseudorandom numbers may be generated based on the values derived from the biometric samples. A first pseudorandom number may be generated by using the first value derived from the first biometric sample of the first user as a seed for the generation of the first pseudorandom number. A second pseudorandom number may be generated using the second value derived from the second biometric sample of the second user as a seed for the generation of the second pseudorandom number. Operation 204 may be performed by one or more processors configured to execute a pseudorandom generation component that is the same as or similar to pseudorandom generation component 24, in accordance with one or more implementations.

At an operation 206, one or more personalizations may be determined based on the pseudorandom numbers. The one or more personalizations may affect characteristics of one or more aspects of the virtual space. A first personalization affecting a first characteristic of a first aspect may be determined based on the first pseudorandom number. A corresponding second personalization affecting a corresponding second characteristic of a corresponding second aspect may be determined based on the second pseudorandom number. Operation 206 may be performed by one or more processors configured to execute a personalization component that is the same as or similar to personalization component 26, in accordance with one or more implementations.

At an operation 208, presentation of the one or more personalizations may be effectuated. The first personalization may be different than the second personalization. Operation 208 may be performed by one or more processors configured to execute a space component that is the same as or similar to space component 28, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide personalization of a virtual space based on an individualized seed value, the system comprising:
    one or more physical computer processors configured by machine readable instructions to:
        obtain values derived from biometric samples of users, an individual biometric sample of an individual user comprising measurements of one or more biological features that are specific to the individual user, an individual value being derived by compiling the measurements of the one or more biological features specific to the individual user, a first value being derived from a first biometric sample of a first user and a second value being derived from a second biometric sample of a second user, the first value being different from the second value due to physical differences between the one or more biological features measured in the first biometric sample of the first user and the one or more biological features measured in the second biometric sample of the second user;
        generate pseudorandom numbers based on the values derived from the biometric samples, a first pseudorandom number being generated by using the first value derived from the first biometric sample of the first user as a seed for the generation of the first pseudorandom number, a second pseudorandom number being generated using the second value derived from the second biometric sample of the second user as a seed for the generation of the second pseudorandom number;
        determine one or more personalizations based on the pseudorandom numbers, the personalizations affecting characteristics of one or more aspects of the virtual space, a first personalization affecting a first characteristic of a first aspect being determined based on the first pseudorandom number and a corresponding second personalization affecting a corresponding second characteristic of a corresponding second aspect being determined based on the second pseudorandom number; and
        effectuate presentation of the one or more personalizations, the first personalization being different than the second personalization.

2. The system of claim 1, wherein, the one or more biological features includes one or more of a fingerprint, a face, a voice, a hand, a palm, an eye, an odor, or DNA.

3. The system of claim 1, wherein a value derived from a biometric sample of a given user is constant.

4. The system of claim 1, wherein the one or more aspects of the virtual space include one or more of an environment within the virtual space, a character within the virtual space, or a theme of the virtual space.

5. The system of claim 1, wherein the one or more characteristics of the one or more aspects of the virtual space include one or more of a visual appearance, an auditory characteristic, a behavioral characteristic, or a storyline.

6. The system of claim 1, wherein the first personalization affecting the first characteristic of the first aspect is further determined based on the first pseudorandom number corresponding to a first table value in a lookup table, and the second personalization affecting the corresponding second characteristic of the corresponding second aspect is further determined based on the second pseudorandom number corresponding to a second table value in the lookup table.

7. The system of claim 1, wherein the first pseudorandom number generated is used in one or more algorithms to determine multiple first personalizations affecting multiple first characteristics of multiple first aspects, and the second pseudorandom number generated is used in one or more algorithms to determine multiple second personalizations affecting multiple second characteristics of multiple second aspects.

8. The system of claim 1, wherein the first pseudorandom number includes a first sequence of numbers such that a series of first personalizations are determined based on the first sequence of numbers generated, and the second pseudorandom number includes a second sequence of numbers such that a series of second personalizations are determined based on the second sequence of numbers generated.

9. The system of claim 1, wherein presentation of the first personalization is effectuated in a first instance of the virtual space and presentation of the second personalization is effectuated in a second instance of the virtual space.

10. The system of claim 1, wherein presentation of the first personalization and presentation of the second personalization is effectuated in the same instance of the virtual space.

11. The system of claim 1, wherein the one or more physical computer processors are further configured by machine readable instructions to store the values derived from the biometric samples in corresponding user profiles, the first value derived from the first biometric sample of the first user being stored in a corresponding first user profile and the second value derived from the second biometric sample of the second user being stored in a corresponding second user profile.

12. A method for providing personalization of a virtual space based on an individualized seed value, the method being implemented by a computer system including one or more physical processors and storage media storing machine-readable instructions, the method comprising:
   obtaining, by the computer system, values derived from biometric samples of users, an individual biometric sample of an individual user comprising measurements of one or more biological features that are specific to the individual user, an individual value being derived by compiling the measurements of the one or more biological features, a first value being derived from a first biometric sample of a first user and a second value being derived from a second biometric sample of a second user, the first value being different from the second value due to physical differences between the one or more biological features measured in the first biometric sample of the first user and the one or more biological features measured in the second biometric sample of the second user;
   generating, by the computer system, pseudorandom numbers based on the values derived from the biometric samples, a first pseudorandom number being generated by using the first value derived from the first biometric sample of the first user as a seed for the generation of the first pseudorandom number, a second pseudorandom number being generated using the second value derived from the second biometric sample of the second user as a seed for the generation of the second pseudorandom number;
   determining, by the computer system, one or more personalizations based on the pseudorandom numbers, the personalizations affecting characteristics of one or more aspects of the virtual space, a first personalization affecting a first characteristic of a first aspect being determined based on the first pseudorandom number and a corresponding second personalization affecting a corresponding second characteristic of a corresponding second aspect being determined based on the second pseudorandom number; and
   effectuating, by the computer system, presentation of the one or more personalizations, the first personalization being different than the second personalization.

13. The method of claim 12, wherein the one or more biological features includes one or more of a fingerprint, a face, a voice, a hand, a palm, an eye, an odor, or DNA.

14. The method of claim 12, wherein a value derived from a biometric sample of a given user is constant.

15. The method of claim 12, wherein the one or more aspects of the virtual space include one or more of an environment within the virtual space, a character within the virtual space, or a theme of the virtual space.

16. The method of claim 12, wherein the one or more characteristics of the one or more aspects of the virtual space include one or more of a visual appearance, an auditory characteristic, a behavioral characteristic, or a storyline.

17. The method of claim 12, wherein the first personalization affecting the first characteristic of the first aspect is further determined based on the first pseudorandom number corresponding to a first table value in a lookup table, and the second personalization affecting the corresponding second characteristic of the corresponding second aspect is further determined based on the second pseudorandom number corresponding to a second table value in the lookup table.

18. The method of claim 12, wherein the first pseudorandom number generated is used in one or more algorithms to determine multiple first personalizations affecting multiple first characteristics of multiple first aspects, and the second pseudorandom number generated is used in one or more algorithms to determine multiple second personalizations affecting multiple second characteristics of multiple second aspects.

19. The method of claim 12, wherein the first pseudorandom number includes a first sequence of numbers such that a series of first personalizations are determined based on the first sequence of numbers generated, and the second pseudorandom number includes a second sequence of numbers such that a series of second personalizations are determined based on the second sequence of numbers generated.

20. The method of claim 12, wherein presentation of the first personalization is effectuated in a first instance of the virtual space and presentation of the second personalization is effectuated in a second instance of the virtual space.

21. The method of claim 12, wherein presentation of both the first personalization and the second personalization are effectuated in the same instance of the virtual space.

22. The method of claim 12, further comprising storing the values derived from the biometric samples in corresponding user profiles, the first value derived from the first biometric sample of the first user being stored in a corresponding first user profile and the second value derived from the second biometric sample of the second user being stored in a corresponding second user profile.

* * * * *